United States Patent [19]

Bettin

[11] 3,739,162

[45] June 12, 1973

[54] SERIAL BCD ADDER WITH RADIX CORRECTION

[75] Inventor: Hubertus Bettin, Braunschweig, Germany

[73] Assignee: Olympia Werke AG, Wilhelmshaven, Germany

[22] Filed: July 14, 1971

[21] Appl. No.: 162,503

[30] Foreign Application Priority Data

July 16, 1970 Germany.................. P 20 35 225.4

[52] U.S. Cl. ................................................ 235/170
[51] Int. Cl. ................................................ G06f 7/50
[58] Field of Search ..................................... 235/170

[56] References Cited

UNITED STATES PATENTS

| | | | |
|---|---|---|---|
| 3,062,446 | 11/1962 | Wormersley et al | 235/170 |
| 3,112,396 | 11/1963 | Heywood | 235/170 |
| 3,146,345 | 8/1964 | Conover, Jr. | 235/170 |
| 3,599,018 | 8/1971 | Washizuka | 307/279 |

*Primary Examiner*—Eugene G. Botz
*Assistant Examiner*—David H. Malzahn
*Attorney*—Spencer & Kaye

[57] ABSTRACT

An MOS transistor circuit arrangement for the calculating mechanism of an electronic computer for adding and subtracting binary numbers under consideration of so called illegal characters (pseudotetrades) which consist of the binary numbers 10 through 15 in the BCD code. The circuit arrangement includes a dynamic shift register, input logic circuit means connected to the first stage of the shift register for adding a pair of binary input signals; test circuit means responsive to the value stored in the shift register for detecting an illegal character and producing an output signal; a clock pulse circuit means responsive to the output of the test circuit means for producing a correction value output signal; and circuit means included in selected stages of the shift register and coupled to the output of the clock pulse circuit for adding the correction value to the value stored in the shift register.

13 Claims, 6 Drawing Figures

| | $2^3$ | $2^2$ | $2^1$ | $2^0$ | | | | |
|---|---|---|---|---|---|---|---|---|
| | 22 | 23 | 24 | 25 | | | | |
| 1 | L | | | | | | | |
| 2 | L | L | | | | | | |
| 3 | L | L | L | | | | | |
| 4 | 0 | L | L | L | | | | |
| | | | | | | | | |
| 5 | 0 | 0 | L | L | L | | | |
| 6 | L | 0 | 0 | L | L | L | | |
| 7 | 0 | L | 0 | 0 | L | L | L | |
| 8 | L | 0 | L +L | 0 | 0 | L | L | L |
| | L | L | 0 | 0 | | | | |
| 9 | 0 | L | L +L | 0 | 0 | 0 | L | L |
| | L | 0 | 0 | 0 | | | | |
| 10 | 0 | L | 0 | 0 | 0 | 0 | 0 | L |
| 11 | 0 | 0 | L | 0 | 0 | 0 | 0 | 0 |
| 12 | 0 | 0 | 0 | L | 0 | 0 | 0 | 0 |

SERIAL BCD ADDER WITH RADIX CORRECTION

BACKGROUND OF THE INVENTION

The present invention relates to a circuit arrangement for the calculating mechanism of an electronic computer for adding and subtracting binary numbers under consideration of pseudotetrades. More particularly, the present invention relates to an improved arrangement of this type wherein the logic circuits are constructed of MOS transistors. As used in this application, a "pseudotetrade" is understood to mean an illegal character or a binary tetrade which does not represent one of the ten basic numerical values, i.e., zero-nine, or a binary value which does represent one of the ten basic numerical values plus a carry signal from the addition thereof. For example, in the conventional 8-4-2-1 binary code, binary value corresponding to the decimal value 11,12 etc. would be a pseudotetrade, as would a binary value corresponding to the decimal value 2 plus a carry signal indicating that the true decimal value following an addition, for example, was 18.

Circuit arrangements for detecting and correcting pseudotetrades are known in the art. Such known circuit arrangements generally consist of an adder at the input, a four-stage shift register chain utilized for the detection of pseudotetrades and possibly for writing in and reading out of values, an adder at the output of the circuit, and a special testing circuit which cooperates with the four-stage shift register and a clock pulse circuit which emits a correction value to the last adder if required.

One known arrangement for adding or subtracting decimal numbers in binary tetrade codes is shown schematically in FIG. 1. Two inputs $x$, $y$ are linked in a binary adding mechanism 1. In order to be able to perform an addition or subtraction — i.e., also multiplication and division, since these are really only repeated additions or subtractions, respectively — in one passage of the data through the calculating mechanism, a four-stage shift register 2–5 is connected to the output of the binary adding mechanism 1 in order to be able to detect the possible occurrence of pseudotetrades. To actually detect the occurrence of a pseudotetrade, a special testing circuit 6 is provided which is responsive to the binary value in the shift register 2–5 and, when a pseudotetrade is detected, emits an output signal to a clock pulse circuit 7. The clock pulse circuit 7 then produces a correction value — a binary 6, when the conventional binary coded decimal form is employed — which is added to the previous result in a further binary adder 8, connected to the output of the shift register 2–5. Thus, for example, if, with the conventional binary code, a value representing the decimal value 14 is detected, the addition thereto of the binary value for six will result in the corrected binary value for four, which is a valid tetrade, appearing at the output a of the binary adder 8. Circuit arrangements for adding and subtracting binary tetrades and correcting same are generally disclosed in "Electronic Counting" by M.L. Klein, F.K. Williams and H.C. Morgan, Instruments and Automation (Feb. 1957), Vol. 30, No. 16, pages 242–248, and "Arithmetic Operations in Digital Computers" by R.K. Richards (1955), pages 81–135, published by D. Van Nostrand.

Very many components are, however, required to construct such circuit arrangements. For example, each adder requires a flipflop circuit for the intermediate storage of the carries, which flipflop circuit is edge-controlled and thus very expensive.

SUMMARY OF THE INVENTION

It is the object of the present invention to provide a circuit arrangement for a calculating mechanism for processing binary numbers which can be kept simpler in its construction and in which a considerable portion of the previously required components can be eliminated.

More particularly, it is an object of this invention to provide an improved circuit arrangement for a calculating mechanism for processing binary numbers to correct pseudotetrades, which circuit arrangement is formed of MOS transistors.

The above objects are achieved according to the present invention by means of a circuit arrangement including an MOS transistor dynamic shift register, an MOS transistor input circuit for the shift register including a half-adder circuit for adding a pair of input signals; an MOS transistor test circuit responsive to the signals in selected stages of the shift register for providing an output signal whenever a pseudotetrade is detected, an MOS transistor pulse circuit responsive to an output signal from the test circuit for producing a binary correction value signal; and circuit means included in selected stages of the shift register and responsive to the output signals from the pulse circuit for adding the corrective value to the value in the shift register.

According to a further feature of the invention, a five-stage shift register is provided which contains two phase-controlled switches in each shift stage, the switches being connected in series via an inverter.

According to a further feature of the invention, the test circuit is responsive to the signals in the first four stages of the shift register while the tetrade to be tested is in the last four stages of the five stage shift register, and the output of the pulse circuit is connected to the input of a half-adder included in the fourth stage of the shift register, which half-adder is interconnected with a half-adder in the third stage of the shift register to form an adder circuit.

According to still a further feature of the invention, the first stage of the shift register also includes a half-adder which is interconnected with the half-adder of the input circuit to form an adder circuit.

The advantages realized with the present invention consist particularly in that a portion of the dynamic shift register takes over arithmetic functions. This results in a substantial saving in components as well as installation and testing times. Additionally, this results in a reduced number of errors and thus reduced maintenance costs.

DESCRIPTION OF THE PREFERRED EMBODIMENTS

Figure 1:
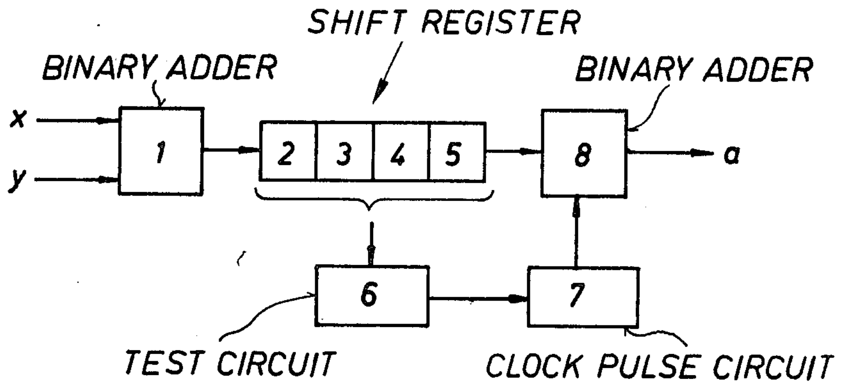
FIG. 1 is a block diagram of a calculating mechanism of the type to which the present invention is directed according to the prior art.
Figure 2:
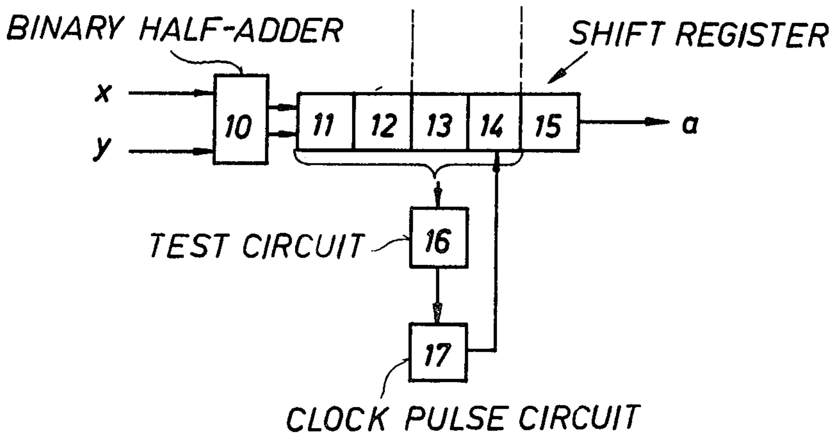
PRIOR ART Fig.2
FIG. 2 is a block diagram of an embodiment of a calculating mechanism according to the present invention.

Referring now to FIG. 2, there is shown in the same schematic manner utilized to describe the prior art of FIG. 1, a circuit arrangement according to the present invention in which a portion of the dynamic shift register consisting of MOS transistors takes over the arithmetic functions. The input signals appearing at the two inputs *x*, *y* are linked in an input logic 10, which has the form of a half-adder, and then pass through the first stage 11, which also constitutes a half-adder, of a five-stage dynamic shift register, 11–15. The presence of a pseudotetrade is detected by means of a testing circuit 16 which initiates the emission of an output or order signal to a pulse circuit 17 which generates a correction value signal. This correction valve is fed to the fourth shift stage 14 of the shift register and is added to the previous result by the third and fourth shift stages 13, 14 which together form an adder and take over the function of the adder 8 in the known circuit according to FIG. 1.

Figure 3:
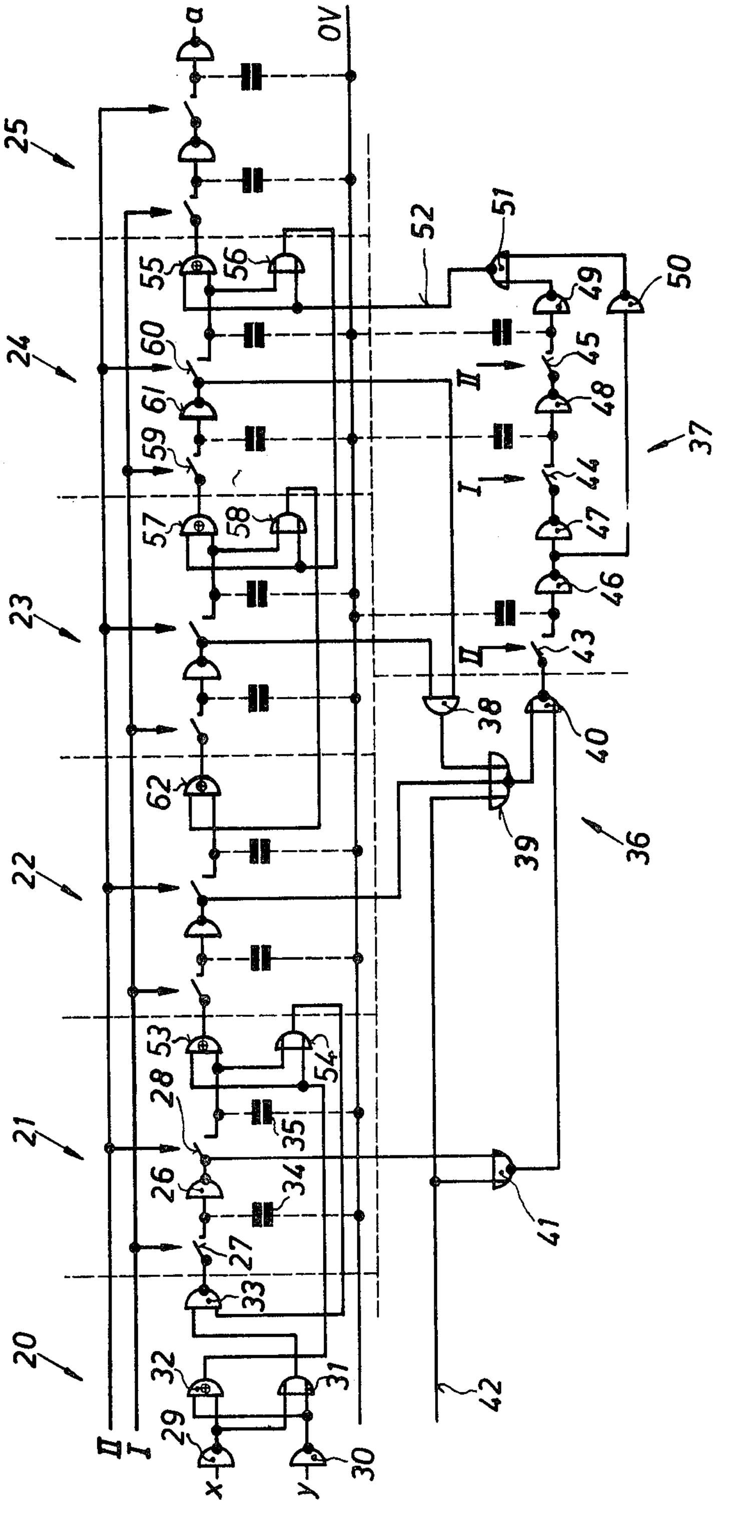
FIG. 3 is a logic circuit diagram of the calculating mechanism of FIG. 2.

The above-described arrangement of FIG. 2 is again illustrated in FIG. 3 in a detailed block logic circuit diagram. The dashed lines separate the individual component groups which are shown in FIG. 2 as boxes. The component group 20 in the left portion of FIG. 3 represents the input logic which together with the first shift stage 21 forms an adder. It is here quite evident that the circuitry required is considerably less than that required for the known adder circuits with an edge-controlled carry flipflop i.e., a flipflop controlled by the edge of the switching signal. The addition of the phase-controlled shift stages consisting of MOS transistors in the half-adder 20 permits the construction of an uncomplicated adder in which an inverter 26 connected between two series connected single-phase controlled switches 27, 28 takes over the function of the carry flipflop in a conventional MOS transistor adder. An adder circuit constructed in this manner is disclosed in applicant's copending U.S. Pat. application Ser. No. 159,694, filed July 6th, 1971, corresponding to German Pat. application Ser. No. P 20 33 154.8.

The two inputs *x*, *y* first lead to the input logic 20 consisting of two inverters 29, 30, an OR gate 31, an exclusive-OR gate 32 and a NAND gate 33, and then to the first shift stage 21. As is customary in dynamic MOS shift registers, the capacitor 34, which is phase-controlled in timing pattern I and formed by the gate electrode of the subsequent MOS transistor, i.e., the gate electrode of the input transistor of inverter 26, is charged with the voltage present at the output of the NAND gate 33. To clarify matters, the subsequently provided MOS transistors which form capacitors and the connections of the capacitors are shown in dashed lines in FIG. 3. The inverter 26 inverts the voltage present at capacitor 34 and feeds it to the phase-controlled switch 28 which is controlled in timing pattern II. A capacitor 35, which is formed by the gate electrode of the again following MOS transistor, is charged, in timing II, to the voltage present at the output of the inverter 26. The output of switch 28 is connected to one input of a further half-adder, formed by exclusive-OR gate 53 and OR gate 54, which is interconnected with the input logic to form a full adder. Thus, at the output of the first shift stage, i.e. the output of exclusive-OR gate 53, a signal is thus available one bit after the *x*, *y* information. The remaining four shift stages 22, 23, 24, 25 which are each also provided with an inverter connected in series between two switches controlled in timing I or II, respectively, follow the first shift stage 21.

In order to detect the presence of pseudotetrades a test circuit 36 is provided which has its signal inputs connected with the first, second, third and fourth shift stages 21–24 and in particular to the output of the inverter of the respective stage. The test circuit 36 is formed by an AND circuit 38 having its two inputs connected to the third and fourth stages 23 and 24 respectively, a NOR gate 39 having its three inputs connected to the output of gate 38, the second shift stage 22 and a test signal line 42 respectively, a NOR gate 41 having its two inputs connected to the first shift stage 21 and the test signal line 42, and a further NOR gate 40 having its two inputs connected to the outputs of NOR gates 39 and 41. With this circuit arrangement, following the receipt of a test timing pulse via line 42 at the time that the tetrade to be tested is in stages 22–25 and upon the detection of a pseudotetrade in the shift register 21–25, i.e., either a binary value greater than decimal nine or 1001 in stages 22–25 or an 1 indicating a carry in stage 21, a signal will appear at the output of NOR gate 40 causing the correction pulse circuit 37 to produce a correction value pulse output signal which is then added to the binary value in the shift register. In the remainder of the disclosure the following terminology will be used for binary values; binary 1 = *L* and binary 0 = 0. As indicated above, in the event of a circuit designed for use with conventional binary coded decimal numbers, the correction circuit 37 produces a correction value pulse output which causes the binary value SIX (OLLO) to be added to the value in the shift register regardless of the particular value of the pseudotetrade.

The correction pulse circuit 37, which is basically a clock pulse circuit, comprises three phase-controlled switches 43, 44, 45, five inverters 46–50, and a NOR gate 51. One input of the NOR gate 51 is coupled to the output of NOR gate 40 of test circuit 36 via the series connection of switch 43, inverters 46, 47, switch 44, inverter 48, switch 45 and inverter 49, while the other input of NOR gate 51 is connected to the output of the inverter 50 whose input is connected to the output of inverter 46. As illustrated, switch 44 is phase controlled by the timing pattern I while switches 43 and 45 are controlled by the timing pattern II. Consequently, since the same timing patterns are utilized in both the shift register and the correction circuit, a possibly required correction value will appear on the output line 52 of the NOR gate 51 in synchronism with the data being shifted in the shift register.

In order to add the correction value to the value being shifted in the shift register, the output line 52 of the correction value circuit 37 is connected to one input of a half-adder, including exclusive-OR gate 55 and OR gate 56, which is contained in the fourth stage 24 of the shift register and whose other input is connected to the output of the series connection of the phase controlled switch 59, the inverter 61 and the phase controlled switch 60 of the fourth shift stage 24. The sum output of exclusive-OR gate 55 is thus the output of the fourth shift stage, while the carry output of OR gate 56 is fed back to one input of a similar half-adder circuit, including exclusive-OR gate 57 and OR gate 58, connected in the output line of the third stage 23. The half-adder comprising gates 57–58 of the third stage 23 and the fourth stage 24 including the half-adder comprising gates 55–56 and the two phase controlled switches 59, 60 and inverter 61, thus form an adder. The carry output of the half-adder comprising gates 57–58 appearing at the output of OR gate 58 is fed back to one input of an exclusive-OR gate 62 whose other input is connected to the output line of the second shift stage 22.

As a result of the shifting of the tetrade through the stages of the shift register, the result of the addition of the signals appearing at the inputs $x$ and $y$, which resultant has been corrected, if necessary, to eliminate a pseudotetrade, appears at the output a of the fifth shift stage 25 after a delay of a full tetrade.

A detailed description of the functional sequence for the correction of a pseudotetrade by means of the circuit arrangement of FIG. 3 will now be discussed below. As indicated above, the presence of a pseudotetrade is determined by applying a test pulse on line 42 at that moment when the tetrade to be checked or tested is present in the shift stages 22, 23, 24 and 25. As further indicated above, a pseudotetrade is identified by the symbol L at the locations having the values $2^3$ and $2^2$ or $2^1$, i.e., the stages 22, 23 and 24, respectively, or at the location for a carry resulting for the addition of the two numbers whose sum is now in stages 22–25, i.e., the stage 21. The checking is done accordingly by AND gate 38 to determine the presence of an L signal in stages 23 and 24 with the value $2^2$ and $2^1$, by the NOR gate 39 to determine the presence of an L signal in stage 22 with the value $2^3$, and by the NOR gate 41 to determine the presence of an L signal in stage 21 representing a carry.

An L signal present in any of the above-mentioned stages appears, because of the subsequently connected inverters, as a 0 signal at the input of the correspondingly connected gate 38, 39 or 41. Accordingly, when a 0 test pulse signal is applied via the line 42 to the NOR gate 39, or the NOR gate 41 and if the other input or inputs of either of these gates is also receiving 0 signals, either the NOR gate 39 or NOR gate 41 will produce an L signal which will cause NOR gate 40 to produce an output signal which will initiate the generation of the correction value SIX (OLLO) in the clock pulse circuit 37. The clock pulse circuit 37 causes an L value signal to be immediately added, via the inverters 46, 50 and the NOR gate 51, to the value present in stage 24, and, via the shift stages 44 and 45, the inverters 47, 48 and 49 and the NOR gate 51, causes an additional L signal which is delayed by one clock pulse to be added to the value previously present in stage 23 after it has been shifted to stage 24. Thus, the clock pulse circuit 37 adds a correction value of SIX to the pseudotetrade by adding two consecutive pulses with the values $2^1$ and $2^2$ since the binary value for the number 6 = 0*LL*0.

Figure 4:
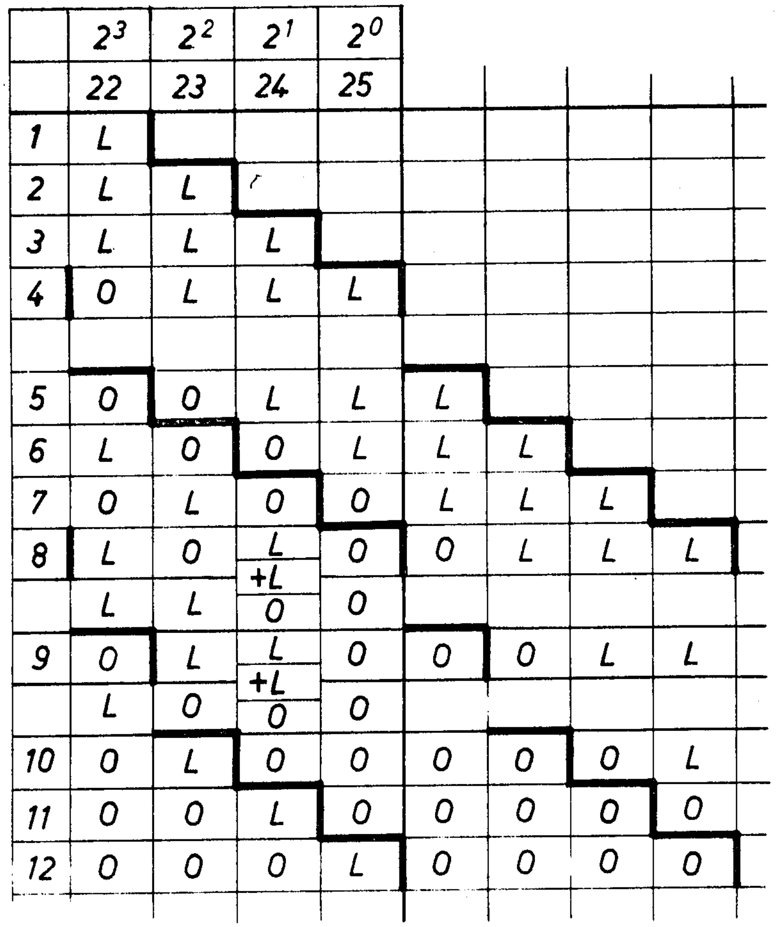
FIG. 4 is a truth table illustrating the operation of the circuit of FIG. 3 for the correction of a pseudotetrade.

For better understanding of the above-described function sequence, the truth table of FIG. 4 illustrates the contents of the shift register stages 22 to 25 of the circuit of FIG. 3 as they change from clock pulse to clock pulse during the function sequence. The clock pulse 1 shifts one digit of a tetrade (e.g. the binary value for the number 7 = tetrade 0*LLL*) in the form of an *L* signal into the shift register stage 22. Each further clock pulse 2, 3 and 4 shifts the tetrade 0*LLL* on. After the fourth clock pulse the entire tetrade 0*LLL* is present in the shift register stages 22 to 25. Now stages 22, 23 and 24 are checked for the presence of a pseudotetrade which in our assumed example is not the case.

The fifth clock pulse begins to shift the tetrade 0*LLL* out of the four shift stages 22 to 25 and to push in a new tetrade (e.g., the binary value for the number 10 = tetrade *L*0*L*0). This tetrade *L*0*L*0 is fully present in the shift stages 22 – 25 after clock pulse 8. Now there is again a check for the presence of a pseudotetrade which in this case is positive.

After recognition of the pseudotetrade L0L0, there occurs the immediate addition of an L signal to the signal in stage 24. Clock pulse 9 again shifts the resulting tetrade *LL*00 by one digit and the first digit of a new tetrade (e.g. 0000) appears in the first stage 22. At the same time there again occurs the addition of an L signal to the signal in stage 24 so that now the tetrade 0000 results. Additionally, since the addition of this latter L correction signal results in a carry, an L signal is added to the digit of the new tetrade in stage 22 via Exclusive OR gate 62. Clock pulses 10, 11 and 12 then take place analogously to clock pulses 6, 7 and 8 and after the 12th clock pulse there again occurs a check for the presence of a pseudotetrade.

Similarly, if after the tetrade to be tested has been shifted into stages 22–25, a carry resulting from the addition of the two numbers forming the tetrade is detected in stage 21, the correction value 0*LL*0 will be added. For example, if when the tetrade 000*L* present in the stages 22–25 after the 12th clock pulse is checked a carry is detected in stage 21 indicating the tetrade in fact represents the decimal value 17, the addition of the correction value SIX during the 12th and 13th clock pulses would produce the corrected value 0*LLL*, which, in addition to the previously present L signal in stage 21 indicating the carry, would result in the desired numerical value for the addition.

Figure 5:
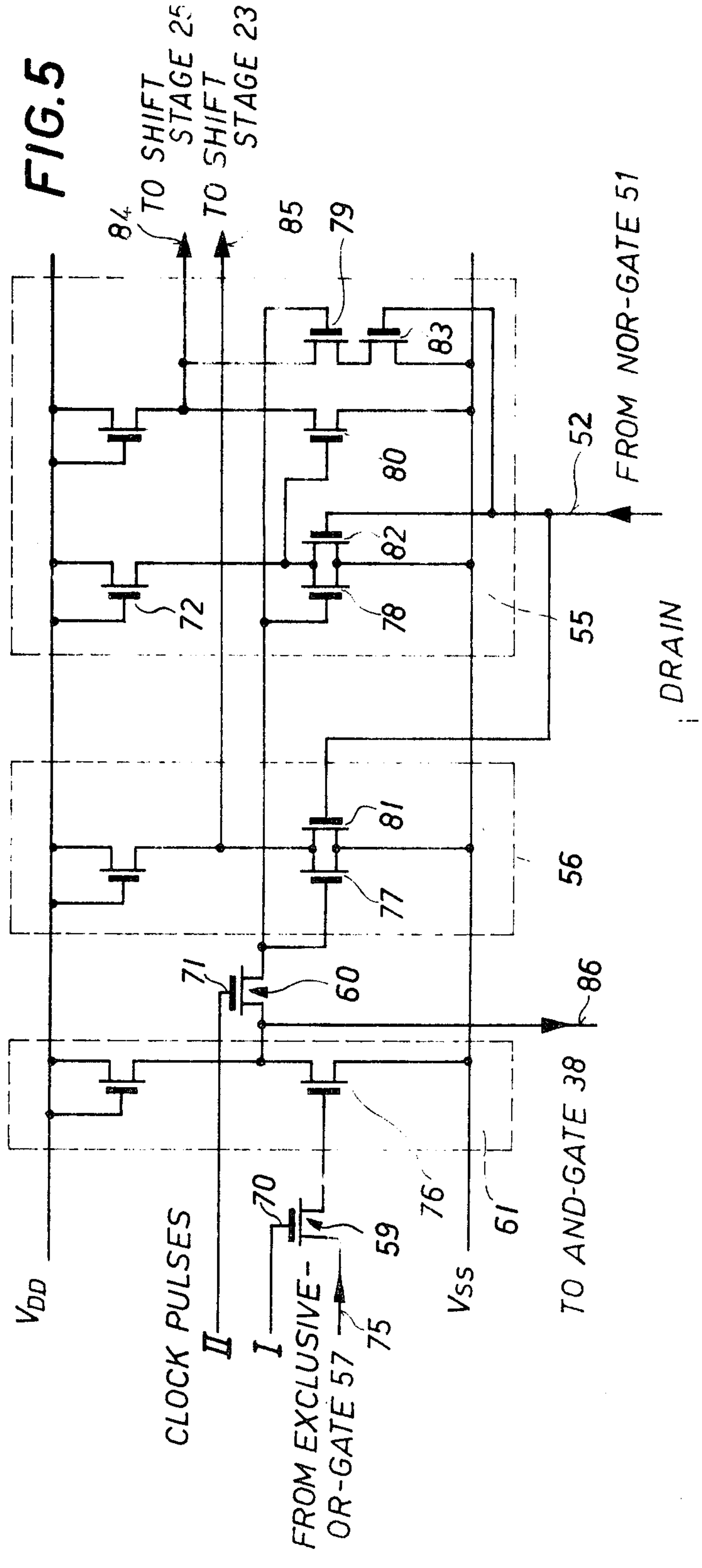
FIG. 5 is a detailed circuit diagram of the shift register stage 24 of FIG. 3.

Referring now to FIG. 5, there is shown a detailed circuit diagram for the shift register stage 24 of the circuit of FIG. 3. This shift register stage 24 is comprised of the switches 59 and 60, inverter 61, the OR gate 56 and the exclusive-OR gate 55, each of which is formed from MOS-FET transistors. The output of the preceding shift stage 23, i.e., the gate 57, is connected to the connecting point 75. The switches 59 and 60 are each formed from a single MOS-FET transistor and have their respective gate electrodes 70 and 71 controlled by shift pulses I and II, respectively, and thus act as phase-controlled switches. The gate capacitance of the control transistor 76 forms the effective storage capacitance in the inverter 61. Similarly the gate capacitances of control transistor 77 in the OR gate 56 and the control transistors 78 and 79 in the Exclusive-OR gate 55 provide the desired effective storage capacitances. Transistor 80 in the Exclusive-OR gate 55 is controlled by the output of the OR gate formed by transistors 72, 78 and 82 which constitutes a portion of the Exclusive-OR gate 55. Via the connecting line 52 from the output of the NOR gate 51 in FIG. 3, the transistors 81, 82, 83 of the Exclusive-OR gate 55 are controlled with the correction signals required for correcting pseudotetrades. The connecting line 84 connects the output of Exclusive-OR gate 55 with the input of the next shift register stage 25 and the line 85 effects the feedback connection from the OR gate 56 to the preceding shift stage 23 for the possibly required carry during the addition of a correction value SIX. The output of inverter 60 is connected via the connecting line 86 with one of the inputs of AND gate 38 of the clock pulse circuit 37 (FIG. 3) and permits interrogation of the shift stage 24 for the presence of a signal which belongs to a pseudotetrade. The lines marked $V_{DD}$ and $V_{SS}$ furnish the supply voltages for drain and source of the MOS-FET transistors which were not shown in the block circuit diagram of FIG. 3.

Figure 6:
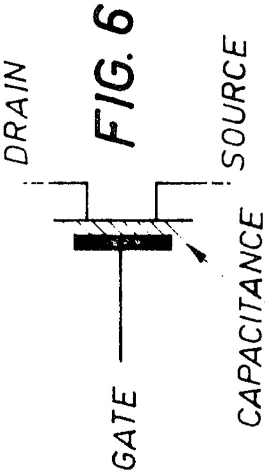
FIG. 6 is a symbolic representation of a field effect transistor illustrating the gate capacitance.

The capacitances 34, 35 etc. which are shown in dashed lines in FIG. 3 are formed by the gate capacitances of the MOS-FET transistors. For better explanation FIG. 6 shows the circuit symbol for the MOS-FET transistor in an enlarged scale. The region which produces a capacitance toward zero volt is here shown in hatching.

To simplify matters the drawings show a two-phase logic. The use of any other phase logic is possible, however, in an analogous manner and does not depart from the idea of the present invention. Instead of the addition employed in the above description, subtractions can be made in a known manner by inverting one of the inputs *x* and *y* and correspondingly changing the correction value appearing on the lead 52.

It will be understood that the above description of the present invention is susceptible to various modifications, changes and adaptations, and the same are intended to be comprehended within the meaning and range of equivalents of the appended claims.

I claim:

1. A circuit arrangement for the calculating mechanism in an electronic computer for adding and subtracting binary numbers under consideration of pseudotetrades comprising in combination:

an MOS transistor dynamic shift register;

an MOS transistor input circuit for said shift register including a half-adder for the addition of a pair of binary input signals, the outputs of said half-adder being connected to the inputs of the first stage of said shift register;

an MOS transistor test circuit means responsive to the signals in selected stages of said shift register for detecting the presence of a pseudotetrade and providing an output signal indicative thereof;

an MOS transistor correction pulse circuit means responsive to said output signal from said test circuit for producing a binary correction value signal; and, circuit means included in selected stages of said dynamic shift register and responsive to the output of said correction pulse circuit means for adding said correction value signal to the value in said shift register.

2. The circuit arrangement defined in claim 1 wherein said shift register has five stages.

3. The circuit arrangement defined in claim 2 wherein each shift register stage contains two phase-controlled switches connected in series via an inverter.

4. The circuit arrangement defined in claim 3 wherein the first stage of said shift register includes a further half-adder having one input thereof connected to the output of said series connection of two phase-controlled switches and an inverter; means interconnecting said input logic and said first stage of said shift register to form an adder, with the output of said adder constituting the output of said first shift register stage.

5. The circuit arrangement defined in claim 4 wherein each of said half-adders in said input circuit and in said first shift stage includes an Exclusive-OR gate and an OR gate; wherein the output of said Exclusive-OR gate in the half-adder of the input circuit is connected to the other input of said half-adder is said first shift stage; and wherein the outputs of the OR gate in each of the half-adders in said input circuit and in said first shift stage are linked to the input of said first shift stage via a NAND gate.

6. The circuit arrangement defined in claim 3 wherein said means for adding said correction value signal to the value in said shift register comprises: a half-adder included in each of the third and fourth shift stages of said shift register, with each of these half-adders having one of its inputs connected to the output of the series connection of two phase-controlled switches and an inverter of the respective shift register stage and its output connected to the input of the subsequent stage of said shift register; means interconnecting said half-adder in said third and fourth shift stages so that said third and fourth shift stages form an adder.

7. The circuit arrangement defined in claim 6 wherein each of said half-adders in said third and fourth shift stages includes an exclusive-OR gate and an OR gate having their inputs connected in parallel, and the output of the respective exclusive-OR gate constitutes the output of each half-adder; wherein the other input of said half-adder in said fourth stage is connected to the output of said correction pulse circuit means; and wherein the output of said OR gate of said half-adder in said fourth stage is connected to the other input of said half-adder in said third stage of said shift register.

8. The circuit arrangement defined in claim 7 wherein the second stage of said shift register includes an exclusive-OR gate whose output constitutes the output of said second stage of said shift register and whose inputs are respectively connected to the output of the series connection of the two phase-controlled switches and the inverter of said second stage, and to the output of said OR gate of said half-adder contained in said third shift stage.

9. The circuit arrangement defined in claim 6 wherein said test circuit means is clock pulse controlled and is enabled and is responsive to the signals in each of the first, second, third and fourth stages of said shift register when the tetrade to be tested is in the second to fifth stages of said shift register and any carry signal from said tetrade to be tested is in said first shift register stage; said test circuit means being enabled by a test pulse on a test pulse timing line connected thereto.

10. The circuit arrangement defined in claim 9 wherein said test circuit means includes an AND gate having its two inputs connected to the outputs of inverters in said third and fourth shift stages, respectively; a first NOR circuit having its inputs connected respectively to the output of said AND gate, the output of said inverter in the second shift stage of said shift register and to said test pulse timing line; a second NOR gate having its inputs connected respectively to said test pulse timing line and to the output of said inverter of said first shift stage; and a third NOR gate having its inputs connected to the outputs of said first and second NOR gates, the output of said third NOR gate constituting the output signal from said test circuit means.

11. The circuit arrangement defined in claim 9 wherein said test circuit means has four inputs each of which is connected to the output of said inverter of a different one of said first to fourth shift stages.

12. The circuit arrangement defined in claim 11 wherein said correction pulse circuit means includes a plurality of phase-controlled switches and inverters and wherein the output of said correction pulse circuit is connected to one of the inputs of said half-adder contained in said fourth shift stage.

13. The circuit arrangement defined in claim 12 wherein the phase-controlled switches of the correction pulse circuit means and the phase-controlled switches of the shift register are controlled with the same phases.

* * * * *